Nov. 11, 1969     M. W. BANG     3,478,180
ROTARY ELECTRIC SWITCH

Filed May 14, 1968     3 Sheets-Sheet 1

INVENTOR
MOGENS W. BANG

BY
Brown, Critchlow, Flick & Peckham
ATTORNEYS.

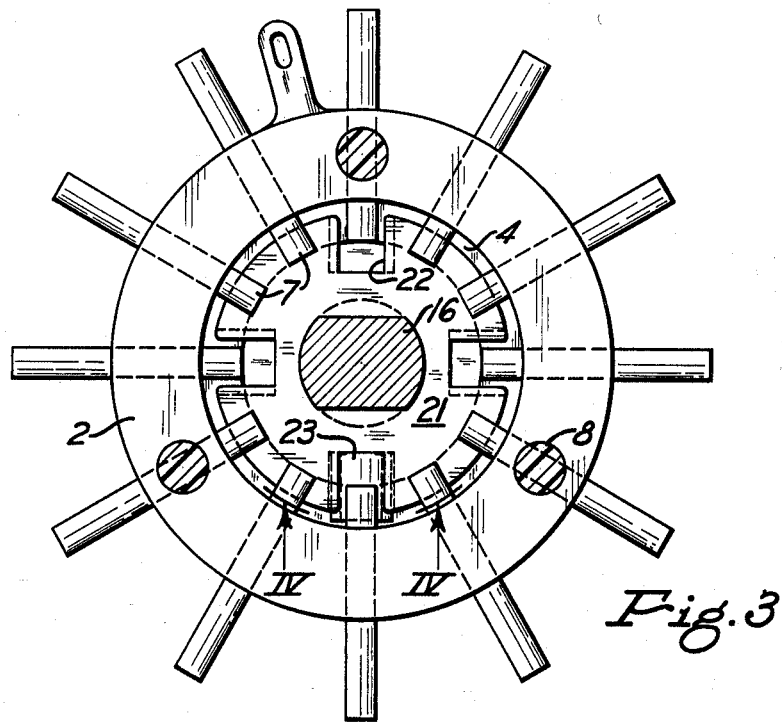
Fig.3
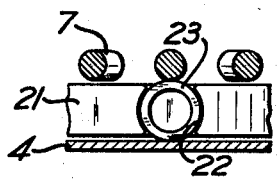
Fig.4
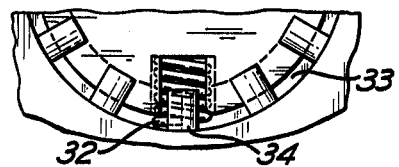
Fig.5
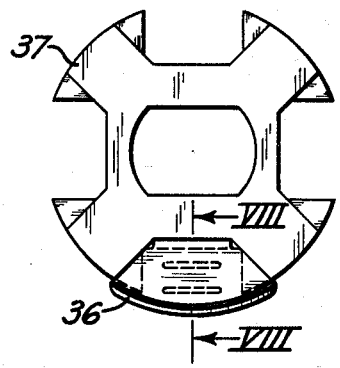
Fig.6
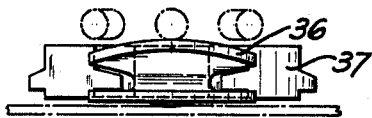
Fig.7
Fig.8
INVENTOR
MOGENS W. BANG

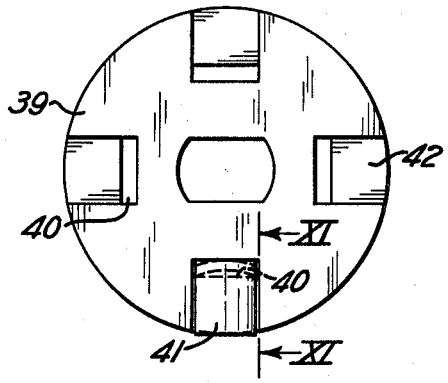
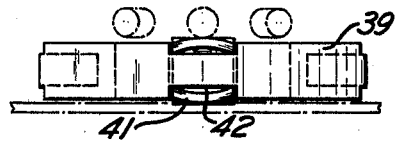
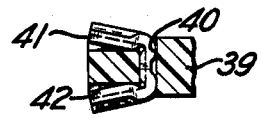
Fig. 9  Fig. 10  Fig. 11
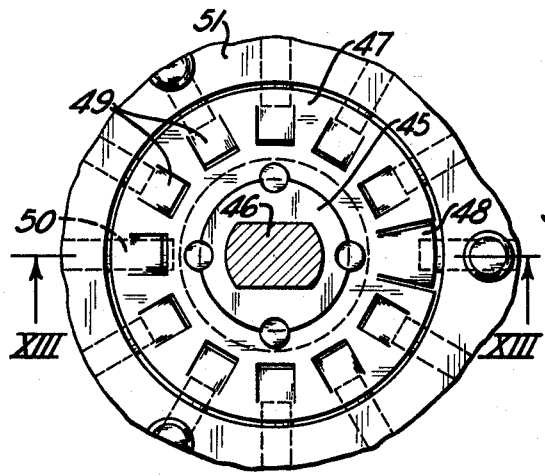
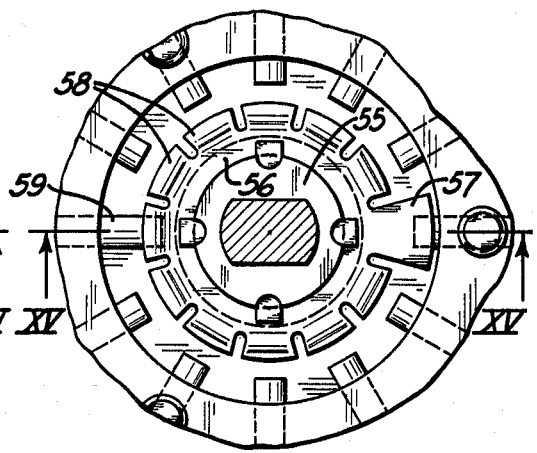
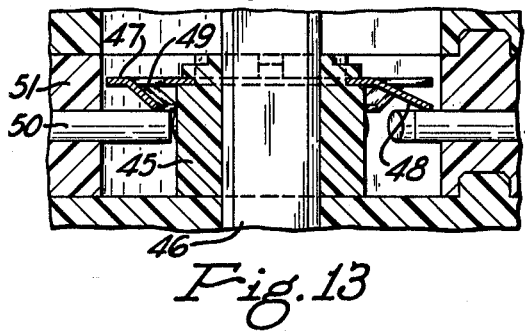
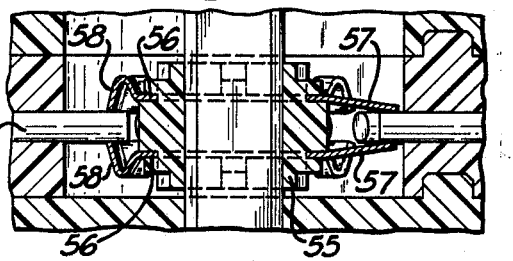
Fig. 12  Fig. 13  Fig. 14  Fig. 15
INVENTOR
MOGENS W. BANG
BY
Brown, Critchlow, Flick & Peckham
ATTORNEYS United States Patent Office 3,478,180
Patented Nov. 11, 1969

3,478,180
ROTARY ELECTRIC SWITCH
Mogens W. Bang, Ridgway, Pa., assignor to Stockpole Carbon Company, St. Marys, Pa., a corporation of Pennsylvania
Filed May 14, 1968, Ser. No. 735,488
Int. Cl. H01h 19/58, 21/78
U.S. Cl. 200—11                    11 Claims

ABSTRACT OF THE DISCLOSURE

Spaced metal contact pins, rigidly mounted in a stator ring of insulating material radially thereof, project inwardly and outwardly from the ring. A rotor within the ring carries one or more electric contacts for engaging each pin in succession when the rotor is turned. A metal collector may be seated against the stator ring and overlie the pins for continuous engagement by the rotor contacts.

---

Rotary electric switches are known in which flat electric contacts are molded into insulating stator rings and are engaged by contacts carried by a rotor. The stator contacts are stamped from a thin metal sheet after it has been molded into the ring, which of course requires special dies and punching operations. Another disadvantage is that the choice of sheet materials from which the contacts can be punched is quite limited. Furthermore, burrs are produced along the edges of the contacts and they wear the movable contacts that slide across the stationary contacts. The smaller the switch, the smaller and thinner the contacts must be, and the thinner the contacts the more that burrs are formed along their edges. Plating problems also arise because if the blanks are plated first the contacts have to be plated again after the punching operation to cover their edges, and the plating material on the scrap can be a sizable loss, in addition to the scrap loss. In the past, two or more of the stator rings have been held together in axial alignment by separate fasteners extending through the rings. When a collector ring has been used, it also has been molded into an insulation ring to hold the collector in position.

It is among the objects of this invention to provide a rotary electric switch, in which the stator contacts are not made from sheet material, in which there are no burrs in the contacting area, in which there is a large choice of contact materials, in which the stationary contacts can be preplated with no further plating required, in which there is no waste of contact material or plating material, in which the collector ring or rings are not molded into insulating rings but still are held in place by the insulating rings, in which the control shaft itself holds the parts of the switch together, and which is cheaper to make than similar known switches.

The invention is illustrated in the accompanying drawings, in which

Figure 1:
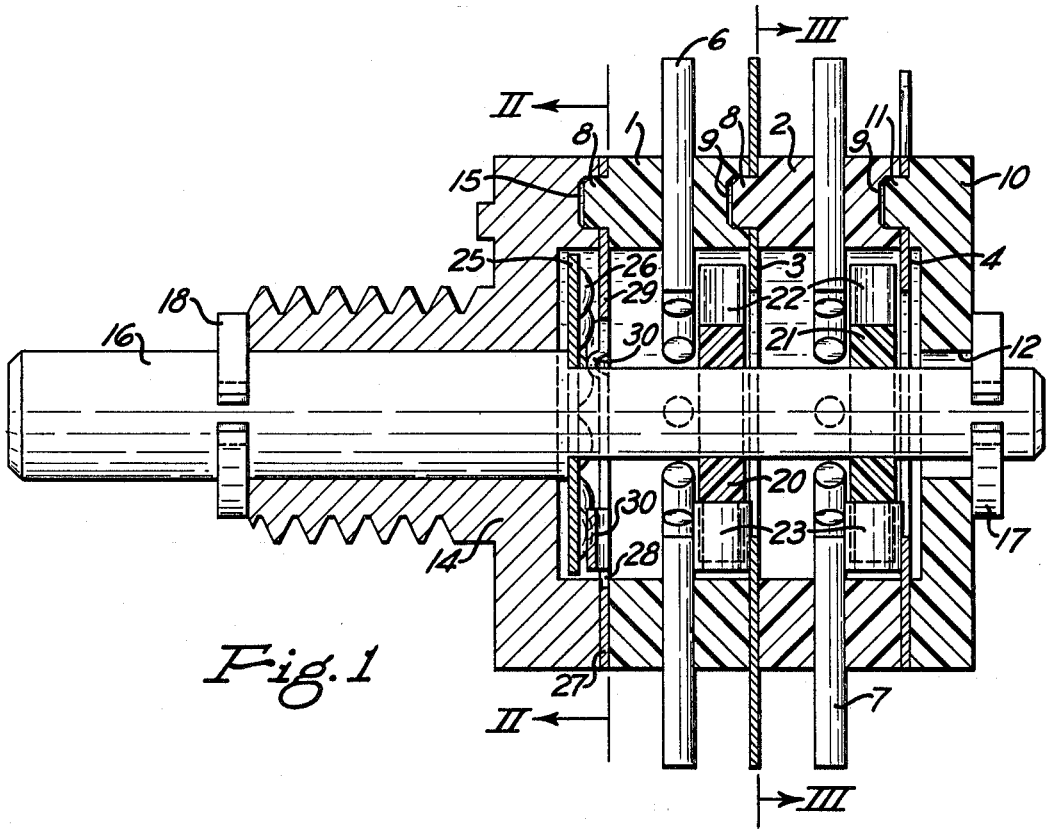
Figure 2:
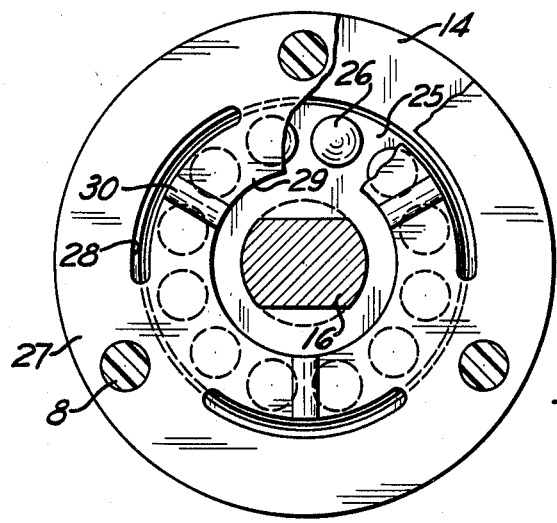

FIG. 1 is a longitudinal section through a switch;
FIG. 2 is a cross section, partly broken away, taken on the line II—II of FIG. 1;
FIG. 3 is a cross section taken on the line III—III of FIG. 1;
FIG. 4 is a fragmentary section taken on the line IV—IV of FIG. 3;
FIG. 5 is a fragmneary elevation of a modification;
FIG. 6 is a view of a modified rotor and contact;
FIG. 7 is an edge view of the rotor;
FIG. 8 is a cross section of the contact taken on the line VIII—VIII of FIG. 6;
FIGS. 9, 10 and 11 are views, similar to FIGS. 6 to 8, of a further embodiment; FIG. 11 being taken on the line XI—XI of FIG. 9;
FIG. 12 is a fragmentary view, similar to FIG. 3, of another modification;
FIG. 13 is a section taken on the line XIII—XIII of FIG. 12; and
FIGS. 14 and 15 are views similar to FIGS. 12 and 13 of a still further embodiment of the invention.

The switch disclosed herein may be made from one or more contact-carrying stator rings and with or without one or more metal collector rings. When no collector ring is used, movable contacts will electrically connect at least two of the fixed contacts. When a collector ring is used, one or more of the fixed contacts will be electrically connected with the collector ring by one or more movable bridging contacts. In the switch illustrated in FIGS. 1 to 4 there are two stator rings 1 and 2 and two collector rings 3 and 4.

Each stator ring is rigid and cylindrical and molded from suitable insulating material, in which a plurality of circumferentially spaced metal pins 6 or 7 are rigidly mounted. The pins extend radially through the rings and project inwardly and outwardly from them in order to form stationary electric contacts within the rings and electric terminals around them. The pins may be either solid or tubular and cut from a coil of wire or a coil of fine tubing. In either case, the pins preferably are molded in the stator rings by the method disclosed in my copending patent application, Ser. No. 698,015, filed Jan. 15, 1968, but they could be forced through preformed radial passages in the rings if desired.

One side of each ring is provided with two or more bosses 8 projecting from it parallel to its axis. The other side of the ring has recesses 9 in it for receiving the bosses on an adjoining member. Thus, when two of these stator rings are placed in axial alignment, with the bosses in one projecting into the recesses in the other, the two rings will be held in alignment and the pins in one stator will be located in a predetermined position relative to those in the other stator. The bosses between the two stator rings also serve another purpose, which is to hold the metal collector ring 3 between the two stators, thereby making it unnecessary to mold the collector into a ring. The collector ring is provided with holes through which the bosses extend, and projects inwardly from between the stator rings. At least a portion of this ring also projects outwardly from the stator rings to form a connection for an electric wire. If the collector ring has a uniform outer diameter as shown, the wire can be connected to it at any point around the switch. Also, the outwardly projecting portion of the ring can serve as shielding for the switch.

The second collector ring 4 is held against the recessed side of stator ring 2 by an end plate 10 provided with bosses 11 that extend through holes in the collector and into the recesses in the adjoining stator ring. This end plate is provided with a central opening 12 through it.

At the other end of the switch, stator ring 1 is covered by a bushing 14 provided with recesses 15 receiving the bosses 8 on the adjoining ring. This bushing has a reduced outwardly projecting threaded portion that can be inserted in a hole in a panel, where it will receive a nut for fastening the switch to the panel. A control shaft 16 is rotatably mounted in the bushing and extends rearwardly through the switch and the opening in end plate 10. A spring clip washer 17 is mounted on the projecting rear end of the shaft and engages the end plate. Another spring clip washer 18 is mounted in a groove in the control shaft in front of the bushing. This washer engages the bushing, so the bushing, the rings and end plate are held together between the two washers on the control shaft. No other means is required for holding the switch together.

Rigidly mounted on the control shaft inside the switch is a pair of rotors 20 and 21 made of insulating material. Rotor 20 is in the area between collector ring 3 and contacts 6, while rotor 21 is located between collector ring 4 and contacts 7. Each of these rotors is provided with one or more circumferentially spaced recesses 22 extending radially inward from its periphery and opening at opposite sides of the rotor. There are fewer recesses than there are stator contacts. Each recess is designed to carry a movable contact 23, but all of the recesses may not contain contacts. The contacts may take any of various forms. For example, as shown in FIG. 4, a contact may be cylindrical with its axis disposed radially of the rotor. The contact is free to rotate in the rotor recess, but the opposite sides of the recess curve part way around the contact to prevent it from slipping out of either side of the rotor. It cannot slide out the open end of the recess because it will strike the inner surface of the encircling stator ring. The cylindrical contacts project from both sides of the rotor so that the contacts can simultaneously engage one of the collector rings and some of the stator contacts beside the rotor. The contact or contacts carried by one rotor electrically connect one of the collector rings and one set of pin contacts, and the other rotor contacts electrically connect the other collector ring with the other set of pin contacts.

In order to hold the rotor contacts in engagement with the desired stator contacts, indexing means are provided. Although these may take various forms, it is preferred to rigidly mount a circular index plate 25 on the control shaft inside the recessed inner end of bushing 14 and provide the plate with circumferentially spaced detents 26 facing the opposite end of the switch. There are as many detents as there are pin contacts in a stator ring. Between the bushing and the adjoining stator ring 1, a circular indexing spring 27 is clamped. The spring is provided with holes, through which the stator bosses 8 extend. The spring ring extends into the switch and is provided just inside the switch with one or more arcuate slots 28 that form arcuate spring portions 29 as shown in FIG. 2. Each of these spring portions has a central area bent toward the index plate to form a radial rib 30 that will fit between and simultaneously engage any two of the index plate detents 26. Consequently, when the control shaft is turned, detents 26 will slide across ribs 30, which will force themselves between adjacent detents when the shaft is released and thereby hold the rotors motionless except when the control shaft is turned manually. The position of the indexing ribs relative to the contact pins is such that when the rotors are in any indexed position the movable contacts 23 will be in engagement with certain of the pin contacts and not between contacts.

Instead of using a solid cylindrical movable contact, it can be formed from a wire coiled into a helix 32 as shown in FIG. 5, which has the advantage of several points of contact with the adjoining collector ring 33 and pin contact 34.

Another form of rotor contact 36 is shown in FIGS. 6, 7 and 8. It is a small piece of metal bent into V-shape and tapered toward the center of the supporting rotor 37, which is provided with a recess that receives it. The outer end of the contact is curved to conform to the encircling stator ring, which prevents the contact from sliding out of the rotor recess. One side of the contact is flat for sliding on a collector ring, and the opposite side may be bowed transversely for sliding across stator contact pins.

A further way of mounting contacts in a rotor is illustrated in FIGS. 9 to 11. The rotor 39 is provided with slots 40 extending through it, the center of each slot being perpendicular to the radius of the rotor. Each movable contact 41 is U-shape and extends through a slot, with the outwardly extending portions of the contact disposed at opposite sides of the rotor for engaging a collector ring and stator contact pins. The sides of the rotor may be provided with shallow recesses 42 for receiving the sides of contact 41.

In some cases it is desirable to electrically connect one of the pin contacts with any one of the other pin contacts. In such a case a collector ring is not used in the switch. As an example of this type of switch, shown in FIGS. 12 and 13, a rotor core 45 of insulating material may be rigidly mounted on the control shaft 46 and carry a metal contact plate 47 that is securely fastened to it. This plate overlies the pin contacts and has a plurality of circumferentially spaced tongues struck out of it toward the contacts. There are as many tongues as pin contacts and they are spaced apart uniformly. Except for a single tongue 48, the rest of the tongues 49 are alike and are engageable in succession with only one pin contact 50 of the group of pin contacts, because contact 50 projects inwardly farther than the others. The tongue 48 extends farther out toward the encircling stator ring 51 into a position where it can engage every pin in succession. It will be seen that with this arrangement the long pin 50 is electrically connected through a tongue 49 and the rotor plate 47 to the shorter stator pin that happens to be engaged by tongue 48.

Another way of getting the same result, illustrated in FIGS. 14 and 15, is to provide the insulating core 55 of the rotor with two axially spaced metal plates 56, each of which is provided with a plurality of radial slots to form spring tongues numbering the same as the pin contacts. Only one pair 57 of these tongues extends out far enough to engage all of the pin contacts. The rest of the tongues 58 can engage only the single pin contact 59 that is longer than the others. By bending the tongues toward the pin contacts in such a manner as to cause them to press against the contacts, the pins are gripped between the two sets of tongues.

By using wire-like pins as shown, their projecting terminal portions can be made long enough to be bent in such a manner as to plug into a printed circuit board. The pins, due to their configuration, are stronger than punched flat contacts. They are as mechanically stable as wider flat contacts and therefore can be disposed in a smaller space so that a smaller switch can be made. The wire or tubing, from which the pins are cut, can easily be plated and the pins will not have to be plated again after being severed because they will have no raw side edges. Any burrs that might be formed are at the ends of the pins where they are not engaged by the movable contacts. No punching tools are required to form the pins, so there can be a wide choice of materials for the contacts. It is a simple matter to cut the pins to any length desired. The tooling used is simple and flexible.

According to the provisions of the patent statutes, I have explained the principle of my invention and have illustrated and described what I now consider to represent its best embodiment. However, I desire to have it understood that within the scope of the appended claims, the invention may be practiced otherwise than as specifically illustrated and described.

I claim:

1. A rotary electric switch, comprising a rigid stator ring of molded insulating material, a plurality of circumferentially spaced metal pins rigidly mounted in said ring radially thereof and projecting inwardly and outwardly from the ring to form electric contacts within the ring and electric terminals around it, each of said pins having a substantially uniform cross section from end to end, a metal collector ring seated against the stator ring and projecting inwardly from it parallel to said pins, a rotor within said ring between the collector ring and pin contacts and provided with an electric contact engaging the side of a pin contact and the adjoining side of the collector ring, and means for turning the rotor to move said contact into engagement with the sides of others of said pin contacts in succession.

2. A rotary electric switch according to claim 1, in which said rotor is provided with a radial recess, and said rotor contact is retained in said recess and is cylindrical with its axis disposed radially of the rotor.

3. A rotary electric switch according to claim 2, in which each rotor contact is a wire helix.

4. A rotary electric switch according to claim 1, in which said rotor is provided with a radial recess, and said rotor contact is loosely disposed in said recess and is U-shape with the free ends of its legs projecting radially beyond the rotor substantially into engagement with the stator ring, said free ends being curved circumferentially of the rotor to conform to the adjoining surface of the stator ring.

5. A rotary electric switch according to claim 1, in which said rotor is provided with a slot therethrough perpendicular to the radius of the rotor, and said rotor contact is substantially U-shape and extends through said slot and outwardly along the opposite faces of the rotor.

6. A rotary electric switch, comprising a rigid stator ring of molded insulating material, a plurality of circumferentially spaced metal pins rigidly mounted in said ring radially thereof and projecting inwardly and outwardly from the ring to form electric contacts within the ring and electric terminals around it, one of said pins projecting inwardly from the ring farther than the others, a rotor within said ring provided with as many electric contacts as there are pins, and means for turning the rotor, one of the rotor contacts being positioned to engage each of said pin contacts in succession, and the rest of the rotor contacts being positioned to be moved in succession into engagement with only said one longer pin.

7. A rotary electric switch according to claim 6, in which said rotor includes a metal ring, and said rotor contacts are spring tongues struck from that ring and bent out of its plane.

8. A rotary electric switch according to claim 6, in which said rotor includes a metal ring provided with radial slots in its outer marginal portion forming said rotor contacts between them.

9. A rotary electric switch according to claim 6, in which said rotor includes a central insulating core surrounded by said pins, and a pair of axially spaced metal rings rigidly mounted on said core and provide with radial slots in their marginal portions forming said rotor contacts, the contacts of each metal ring being bent toward the other metal ring, and the inner ends of said pins being gripped between the contacts of the two rings.

10. A rotary electric switch, comprising a pair of coaxial rigid stator rings of molded insulating material, a metal collector ring clamped between the stator rings and projecting inwardly from them, the collector ring being provided with circumferentially spaced holes between the adjoining rings, one of the stator rings having recesses therein registering with said holes, the other stator ring being provided with integral bosses extending through said holes and into said recesses for holding the rings in alignment, a cover plate for one of the stator rings provided with a central opening, a cover bushing for the other stator ring, a control shaft extending through said bushing and plate opening and rotatable therein, means on the shaft holding said bushing and plate in place with said rings between them, a set of circumferentially spaced metal pins rigidly mounted in each stator ring radially thereof and projecting inwardly and outwardly therefrom to form electric contacts within the ring and electric terminals around it, a rotor rigidly mounted on said shaft between a set of said pins and the collector ring, the rotor being provided with an electric contact engaging one side of the collector ring and an adjacent pin contact, a second rotor rigidly mounted on said shaft beside the other set of contact pins, and an electric contact carried by the second rotor for engaging the pins of said other set.

11. A rotary electric switch, comprising a rigid stator ring of molded insulating material, a plurality of circumferentially spaced metal pins rigidly mounted in said ring radially thereof and projecting inwardly and outwardly from the ring to form electric contacts within the ring and electric terminals around it, a metal collector ring seated against the stator ring and projecting inwardly from it parallel to said pins, the collector ring being provided with circumferentially spaced holes and the stator ring having integral bosses extending through said holes, a rotor within said ring between the collector ring and pin contacts and provided with an electric contact engaging a pin contact and the adjoining side of the collector ring, and means for turning the rotor to move said contact into engagement with others of said pin contacts in succession.

References Cited
UNITED STATES PATENTS

| | | | |
|---|---|---|---|
| 2,472,230 | 6/1949 | Reinschmidt | 200—158 |
| 3,135,840 | 6/1964 | Ausfeld | 200—8 |
| 3,138,672 | 6/1964 | Schlesinger. | |
| 3,177,306 | 4/1965 | Mastney | 200—14 XR |
| 3,184,559 | 5/1965 | Oxley. | |
| 3,214,528 | 10/1965 | Seabury et al. | 200—8 XR |
| 3,226,496 | 12/1965 | Seabury | 200—8 XR |
| 3,229,051 | 1/1966 | Hauser et al. | 200—14 XR |
| 3,290,456 | 12/1966 | Meyer | 200—14 |
| 3,308,249 | 3/1967 | Cullen | 200—14 |
| 3,311,717 | 3/1967 | Lace | 200—8 |

ROBERT K. SCHAEFER, Primary Examiner

J. R. SCOTT, Assistant Examiner

U.S. Cl. X.R.

200—14